(12) United States Patent
Meijer

(10) Patent No.: US 9,419,915 B2
(45) Date of Patent: Aug. 16, 2016

(54) METHODS AND SYSTEMS FOR RESOURCE ALLOCATION

(71) Applicant: THEPLATFORM, LLC, Seattle, WA (US)

(72) Inventor: Paul Meijer, Seattle, WA (US)

(73) Assignee: thePlatform, LLC, Seattle, WA (US)

( * ) Notice: Subject to any disclaimer, the term of this patent is extended or adjusted under 35 U.S.C. 154(b) by 147 days.

(21) Appl. No.: 14/488,904

(22) Filed: Sep. 17, 2014

(65) Prior Publication Data

US 2016/0080282 A1    Mar. 17, 2016

(51) Int. Cl.
  *G06F 15/16* (2006.01)
  *H04L 12/911* (2013.01)
  *H04L 29/08* (2006.01)
  *H04L 29/06* (2006.01)

(52) U.S. Cl.
  CPC ............... *H04L 47/70* (2013.01); *H04L 29/06* (2013.01); *H04L 29/08072* (2013.01)

(58) Field of Classification Search
  CPC ..................... H04L 29/08072; H04L 29/06
  USPC ................ 709/203, 206, 220; 370/227, 445
  See application file for complete search history.

(56) References Cited

U.S. PATENT DOCUMENTS

| | | | | |
|---|---|---|---|---|
| 8,331,377 B2* | 12/2012 | Attar | ............... | H04L 1/0002 370/310 |
| 9,059,976 B2* | 6/2015 | Lacapra | ............... | H04L 67/1097 |
| 9,264,374 B2* | 2/2016 | Kullangal Sridhara | ............... | H04L 47/6255 |
| 9,281,919 B2* | 3/2016 | Lee | ............... | H04H 40/18 |
| 2004/0208183 A1* | 10/2004 | Balachandran | ............... | H04L 12/5693 370/395.21 |
| 2015/0245341 A1* | 8/2015 | Grant | ............... | H04B 7/18539 370/336 |

* cited by examiner

*Primary Examiner* — Khanh Dinh
(74) *Attorney, Agent, or Firm* — Ballard Spahr LLP

(57) ABSTRACT

An example method according to the disclosure can comprise receiving a requested number of slots from a user at a computing system. The computing system can be associated with a plurality of slots for processing one or more jobs. Each of the plurality of slots can be associated with a status (e.g., used, available, idle). A user can request a requested number of slots from the computing system. A quantity of slots can be allocated to the user based on the request, user category (e.g., under-served, adequately served), slot status and other factors. Only idle slots can be allocated to the adequately served user, whereas both available slots and idle slots can be allocated to the under-served user. One or more slots allocated to a user can be re-allocated to other users.

20 Claims, 5 Drawing Sheets

FIG. 2

202 Receive, at a computing system, a request from a user for a requested number of slots for processing one or more jobs

204 Determine, at the computing system, an expected number of slots associated with the user

206 Compare, at the computing system, the requested number of slots to the expected number of slots

208 If the requested number of slots is less than the expected number of slots, allocating the requested number of slots, wherein the allocated slots are available slots, idle slots, or a combination thereof

210 If the requested number of slots is greater than or equal to the expected number of slots, allocating a quantity of slots, wherein the quantity of slots comprises the expected number of slots selected from available slots, idle slots or a combination thereof, and additional one or more idle slots up to the requested number of slots, if there are additional one or more idle slots associated with the computing system

212 Process, at the computing system, the one or more jobs using the allocated slots

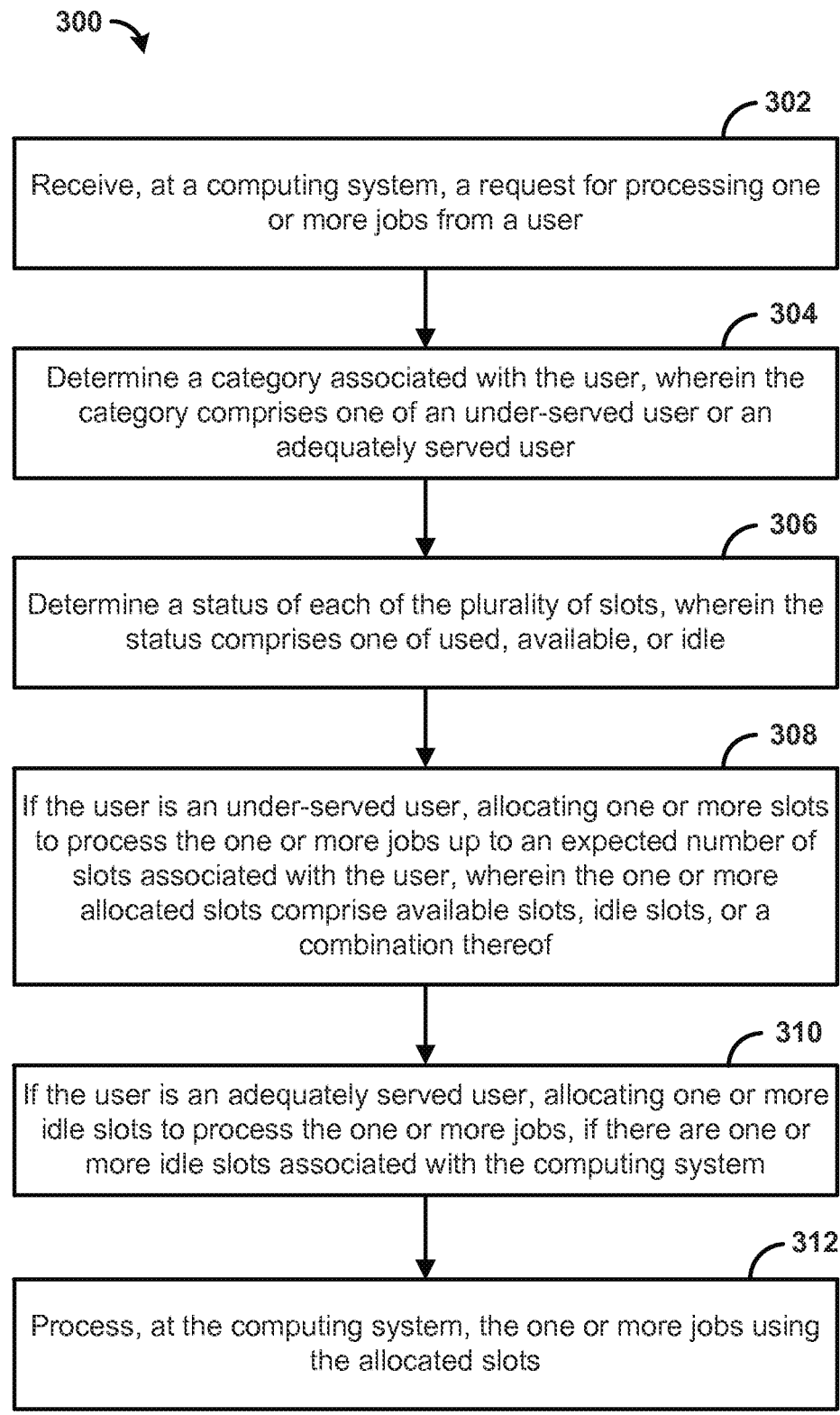

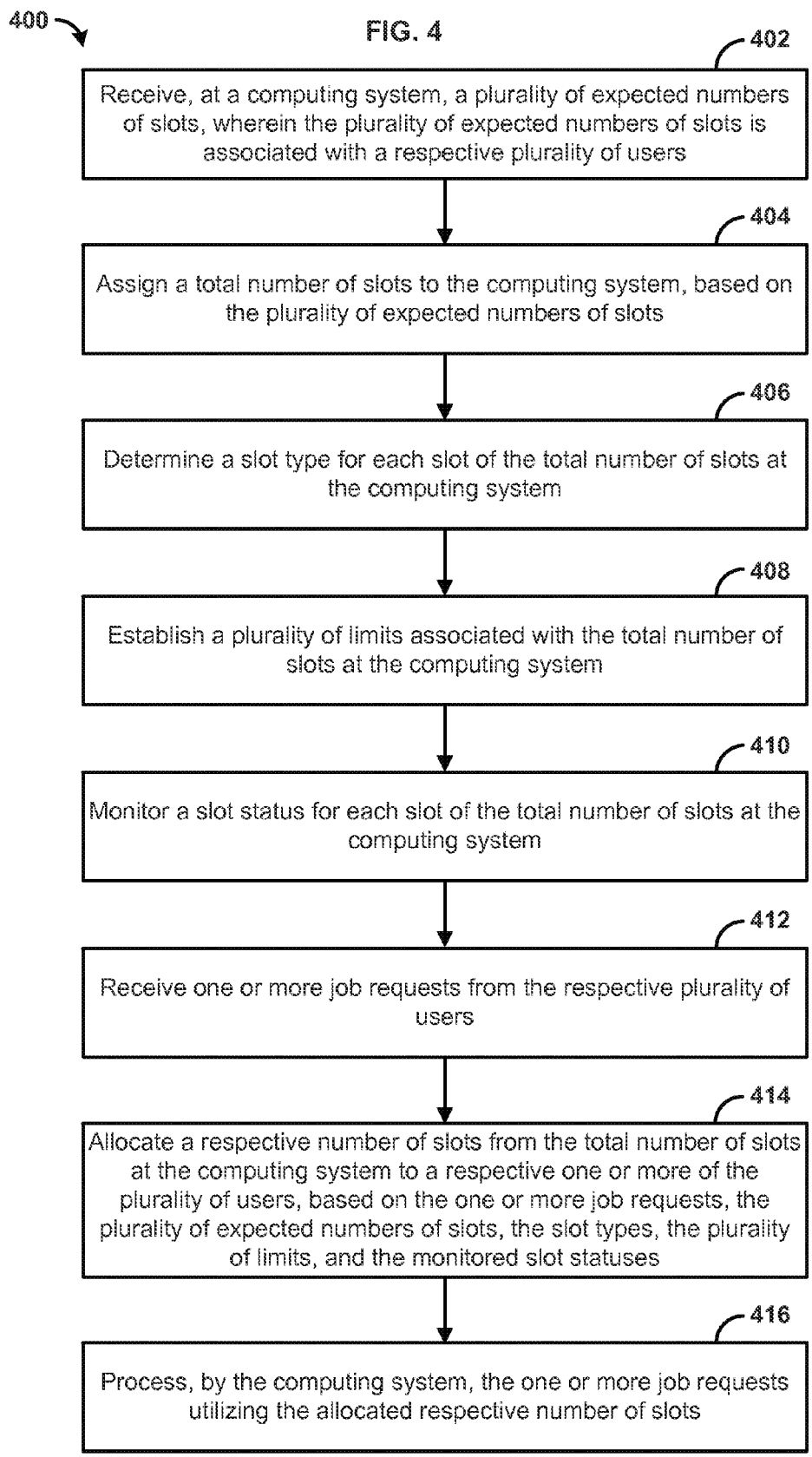

METHODS AND SYSTEMS FOR RESOURCE ALLOCATION

BACKGROUND

When resources are shared by many different users, a round-robin mechanism is often used to process requests from different users. However, the processing time for each request can vary depending on the nature of the requests, such as size and number of the input files and output files associated with each request. As a result, some users will consume more resource capacity than others or even dominate resources. There is a need for methods and systems for managing resource allocation more efficiently.

SUMMARY

It is to be understood that both the following general description and the following detailed description are exemplary and explanatory only and are not restrictive, as claimed. Provided are methods and systems for resource allocation. A computing system can be associated with a plurality of slots (e.g., encoding slots) for processing one or more jobs, for example, encoding one or more videos, transcoding one or more videos, and the like. The computing system can receive a request for a requested number of slots for processing one or more jobs from a user. The computing system can determine an expected number of slots associated with the user. The requested number of slots can be compared to the expected number of slots. If the requested number of slots is less than the expected number of slots, the requested number of slots can be allocated to the user. In this scenario, the allocated slots can be available slots, idle slots, or a combination thereof. If the requested number of slots is greater than or equal to the expected number of slots, a quantity of slots can be allocated to the user. In this scenario, the quantity of slots can comprise the expected number of slots selected from available slots, idle slots or a combination thereof, and additional one or more idle slots up to the requested number of slots, if there is additional one or more idle slots associated with the computing system. The one or more jobs can be processed at the computing system using the allocated slots.

In an aspect, the computing system can receive a request for processing one or more jobs from a user. The computing system can determine a category associated with the user. In an aspect, the category associated with the user can comprise one of an under-served user or an adequately served user. A status of each of the plurality of slots can be determined. The status can comprise one of used, available, or idle. If the user is an under-served user, one or more slots can be allocated to process the one or more jobs up to an expected number of slots associated with the user. The one or more allocated slots can comprise available slots, idle slots, or a combination thereof. If the user is an adequately served user, one or more idle slots can be allocated to process the one or more jobs, if there is one or more idle slots associated with the computing system. The one or more jobs can be processed at the computing system, using the allocated one or more slots, if any.

In another aspect, the computing system can receive a plurality of expected numbers of slots. The plurality of expected numbers of slots can be associated with a respective plurality of users. A total number of slots can be assigned to the computing system, based on the plurality of expected numbers of slots. A slot type for each slot of the total number of slots can be determined at the computing system. A plurality of limits associated with the total number of slots at the computing system can be established. A slot status for each slot of the total number of slots at the computing system can be monitored. In an aspect, one or more job requests can be received from the respective plurality of users. A respective number of slots from the total number of slots at the computing system can be allocated to a respective one or more of the plurality of users. The respective number of slots allocated to the respective one or more of the plurality of users can be based on the one or more job requests, the plurality of expected numbers of slots, the slot types, the plurality of limits, and the monitored slot statuses. The one or more job requests can be processed utilizing the allocated respective number of slots.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 2 is a flowchart illustrating an example method;

FIG. 3 is a flowchart illustrating another example method;

FIG. 4 is a flowchart illustrating another example method; and

DETAILED DESCRIPTION

Figure 1:
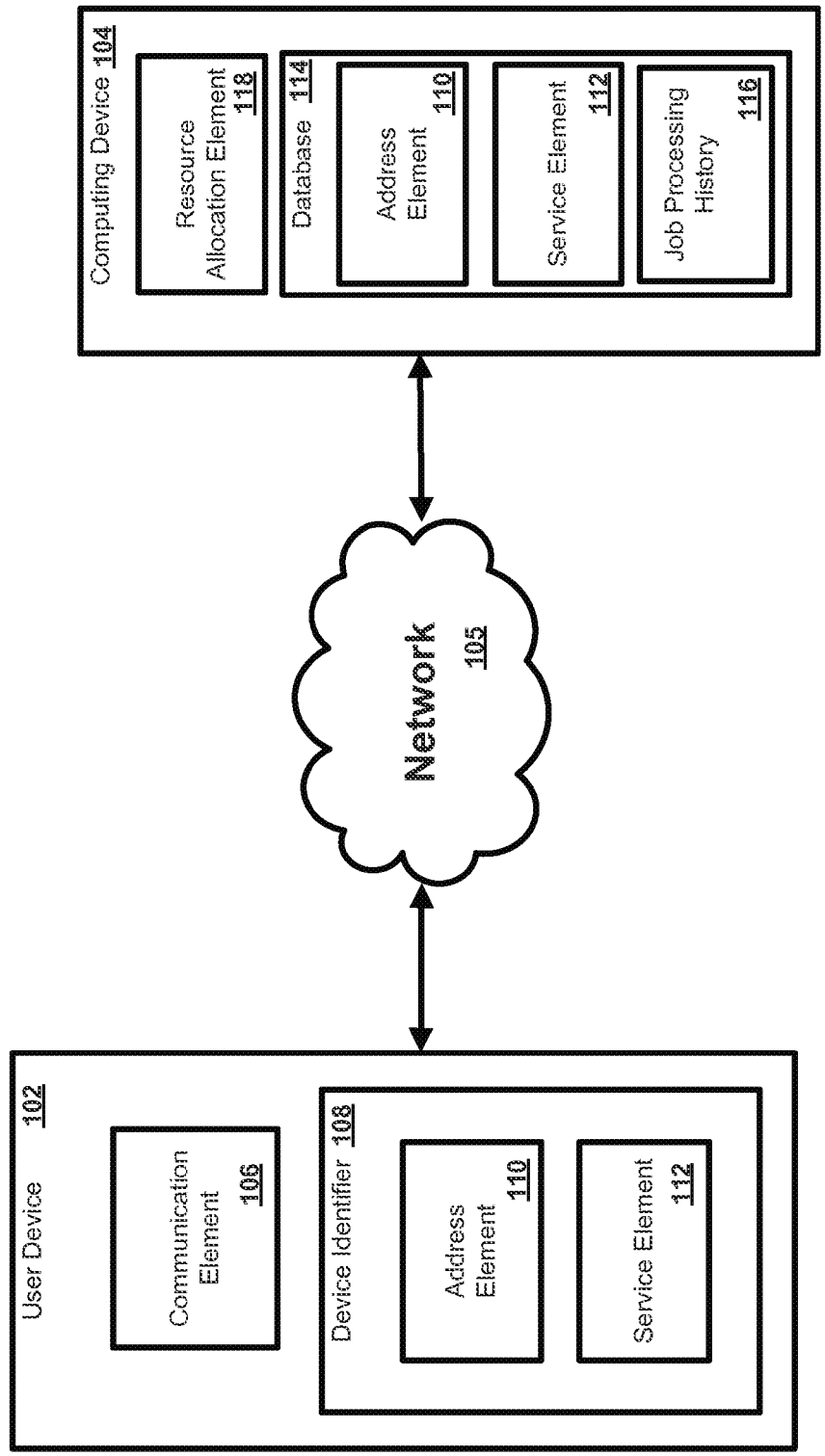
FIG. 1 illustrates various aspects of an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Methods and systems for resource allocation are disclosed. A computing system can be associated with a plurality of slots (e.g., encoding slots) for processing one or more jobs, for example, encoding one or more videos, transcoding one or more videos, and the like. Each of the plurality of slots can be associated with a status. The status can comprise one of used, available, or idle. A user can request a requested number of slots from the computing system and a number of slots can be allocated to the user based on the request. A user category (e.g., under-served user, adequately served user) can be determined by comparing the requested number of slots and an expected number of slots. In an aspect, only idle slots can be allocated to an adequately served user, whereas both available slots and idle slots can be allocated to an under-served user. In an aspect, one or more slots allocated to a user can be re-allocated to other users. For example, if an under-served user sends a request for processing one or more jobs, the computing system can cancel a job for an adequately served user and therefore release a slot associated with the canceled job. The computing system can allocate the released slot to the under-served user. As such, the disclosed methods and systems can provide dynamic resource allocation that prevents one or more users from dominating resources.

In another aspect, an example method can comprise determining a status of a slot. For example, if a slot is performing a job (e.g., encoding job, decoding job), the slot can be flagged as used. If a slot is not performing a job (e.g., encoding job), the slot can be flagged as available. If a slot has been available for more than a threshold amount of time, the slot can be flagged as idle. As an example, the flag can be in the form of codes, symbols, glyph, and the like. The flag to mark a used encoding slot can be different from the flag to mark as an available slot. The flag to mark an idle slot can be different from the flag to mark as a used slot and different from the flag to mark as an available slot. In an aspect, the flag can comprise a time that the respective slot has become available. In an aspect, the flag can comprise a time that the respective slot has become idle.

FIG. 1 illustrates various aspects of an exemplary system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The present disclosure is relevant to systems and methods for providing services to a device, for example, a user device such as a computer, tablet, mobile device, communications terminal, or the like. In an aspect, one or more network devices can be configured to provide various services to one or more devices, such as devices located at or near a location. In another aspect, the network devices can be configured to recognize an authoritative device for the location and/or a particular service or services available at the location. As an example, an authoritative device can be configured to govern or enable connectivity to a network such as the Internet or other remote resources, provide address and/or configuration services like DHCP, and/or provide naming or service discovery services for a location, or a combination thereof. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network and system can comprise a user device 102 in communication with a computing device 104. By way of example, the user device 102 can comprise computer, PDA, smartphone, GPS, vehicle entertainment system, portable media player, a server, a network device, a set top box, or other device capable of communicating with the computing device 104.

In an aspect, the computing device 104 can comprise a server for communicating with the user device 102. As an example, the computing device 104 can communicate with the user device 102 for providing data and/or services. In an aspect, the computing device 104 can comprise a computing system for providing various services. As an example, the computing device 104 can provide services such as network printing, media management (e.g., media server), content services, streaming services, encoding services, decoding services, encryption services, decryption services, or other services. In an aspect, the computing device 104 can be associated with a plurality of slots (e.g., encoding slots, decoding slots, etc.). As an example, a slot can be a unit of a computing system (e.g., computing device 104) capable of providing a service. The plurality of slots can be considered as logical resource units. Each of the plurality of slots can be used to process one or more jobs simultaneously. In an aspect, each of the plurality of slots can be associated with a status (e.g., used, available, idle).

In another aspect, each of the plurality of slots can be associated with a slot type. Slot types can be heterogeneous. For example, a slot type can be associated with encoding a type of scene, such as a fast motion scene, a static scene, a black and white scene, and the like. As another example, a slot type can be associated with encoding a video file (e.g., HD video file, SD video file), an audio file, or both. As another example, a slot type can be associated with encoding a long scene (e.g., greater than 10 minutes), a medium length scene (e.g., between 5 and 10 minutes), or a short scene (e.g., shorter than 5 minutes). As another example, a slot type can be associated with a type of codec such as AV 8, H.264, Advanced Video Coding (AVC), MPEG, and the like.

In an aspect, the computing device 104 can allow the user device 102 to interact with remote resources such as data, devices, and files. As an example, the computing device 104 can be configured as (or disposed at) a central location (e.g., a headend, or processing facility), which can receive content (e.g., data, input programming) from multiple sources. The computing device 104 can combine the content from the multiple sources and can distribute the content to user (e.g., subscriber) locations via a distribution system.

The computing device 104 can be disposed locally or remotely relative to the user device 102. As an example, the user device 102 and the computing device 104 can be in communication via a private and/or public network 105 such as the Internet or a local area network. Other forms of communications can be used such as wired and wireless telecommunication channels, for example.

In an aspect, the user device 102 can comprise a communication element 106 for providing an interface to a user to interact with the user device 102 and/or the computing device 104. The communication element 106 can be any interface for presenting and/or receiving information to/from the user, such as user feedback. An example interface may be communication interface such as a web browser (e.g., Internet Explorer, Mozilla Firefox, Google Chrome, Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device such as the computing device 104. For example, the user device 102 can transmit a request for a requested number of slots (e.g., encoding slots) to the computing device 104 via the communication element 106. As another example, the user device 102 can transmit a request for processing one or more jobs (e.g., encoding jobs) to the computing device 104 via the communication element 106.

In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device such as a manufacturer, a model or type of device, a service provider associated with the user device 102, a state of the user device 102, a locator, and/or a label or classifier. Other information can be represented by the device identifier 108. As an example, the device identifier 108 can be transmitted when a requested number of slots (e.g., encoding slots) or a request for processing one or more jobs is transmitted from the user device 102 to the computing device 104. As another example, the device identifier 108 can be transmitted when a job (e.g., encoding job) is submitted from the user device 102 to the computing device 104.

In an aspect, the device identifier 108 can comprise an address element 110 and a service element 112. In an aspect, the address element 110 can comprise or provide an internet protocol address, a network address, a media access control (MAC) address, an Internet address, or the like. As an example, the address element 110 can be relied upon to establish a communication session between the user device 102 and the computing device 104 or other devices and/or networks. As a further example, the address element 110 can be used as an identifier or locator of the user device 102. In an aspect, the address element 110 can be persistent for a particular network. As an example, the address element 110 can be transmitted when a requested number of slots (e.g., encoding slots) is transmitted from the user device 102 to the computing device 104. As another example, the address element 110 can be transmitted when a request (e.g., a request for processing one or more encoding jobs) is submitted from the user device 102 to the computing device 104.

In an aspect, the service element 112 can comprise an identification of a service provider associated with the user device 102 and/or with the class of user device 102. The class of the user device 102 can be related to a type of device, capability of device, type of service being provided (e.g., encoding service, decoding service, transcoding service), and/or a level of service (e.g., business class, service tier, service package, etc.). As an example, the service element 112 can comprise information relating to or provided by a service provider (e.g., encoding service provider) that is providing or enabling data flow such as encoding services to the user device 102. As a further example, the service element 112 can comprise information relating to a preferred service provider for one or more particular services relating to the user device 102. In an aspect, the address element 110 can be used to identify or retrieve data from the service element 112, or vice versa. As a further example, one or more of the address element 110 and the service element 112 can be stored remotely from the user device 102 and retrieved by one or more devices such as the user device 102 and the computing device 104. Other information can be represented by the service element 112.

In an aspect, the computing device 104 can manage the communication between the user device 102 and a database 114 for sending and receiving data therebetween. As an example, the database 114 can store a plurality of files (e.g., web pages), user identifiers or records, category of users (e.g., under-served users, adequately served users), status of each of a plurality of slots at a computing system (e.g., computing device 104), or other information. As a further example, the user device 102 can request and/or retrieve a file from the database 114. In an aspect, the database 114 can store information relating to the user device 102 such as the address element 110 and/or the service element 112. As an example, the computing device 104 can obtain the device identifier 108 from the user device 102 and retrieve information from the database 114 such as the address element 110 and/or the service elements 112. As a further example, the computing device 104 can obtain the address element 110 from the user device 102 and can retrieve the service element 112 from the database 114, or vice versa. Any information can be stored in and retrieved from the database 114. As an example, the database 114 can comprise a job processing history 116. For example, the processing history 116 can comprise time (e.g., submission time, processing time, etc.) associated with jobs related to a user (e.g., user device 102). As another example, the job processing history 116 can comprise types and numbers of slots used to process jobs related to a user (e.g., user device 102) at any given time. As another example, the job processing history 116 can comprise number of used slots, available slots and idle slots associated with the computing device 104 at any given time. As another example, the job processing history 116 can comprise a plurality of expected number slots for a respective plurality of users. The job processing history 116 can be used for resource capacity planning. The database 114 can be disposed remotely from the computing device 104 and accessed via direct or indirect connection. The database 114 can be integrated with the computing system 104 or some other device or system.

In an aspect, the computing device 104 can comprise a resource allocation element 118. The resource allocation element 118 can be configured to allocate a respective number of slots from total number of slots associated with the computing device 104 to a respective plurality of users, based on the one or more job requests, a plurality of expected numbers of slots associated with the plurality of users, slot types, slot statuses, resource center policy, and the like. In an aspect, the resource allocation element 118 can allocate a respective number of slots to a plurality of users based on job processing history 116.

FIG. 2 is a flowchart illustrating an example method 200. At step 202, a request for a requested number of slots for processing one or more jobs can be received from a user. As an example, the one or more jobs can comprise video processing jobs and the plurality of slots can be configured to process video. In an aspect, the request can be received at a computing system (e.g., computing device 104). The computing system can comprise one or more computing devices. In an aspect, the computing system can be associated with a plurality of slots (e.g., logical resource units). As an example, the computing system can be a resource center. For example, an encoding computing system (e.g., the computing device 104) can receive a request for 20 encoding slots to encode one or more encoding jobs from a user (e.g., the user device 102).

In an aspect, the one or more jobs (e.g., encoding jobs) can be associated with one or more slot types. For example, a portion of the one or more jobs (e.g., encoding jobs) can be associated with a long scene (e.g., greater than 10 minutes), and another portion of the one or more jobs (e.g., encoding jobs) can be associated with a medium length scene (e.g., between 5 and 10 minutes). As another example, a portion (e.g., 10) of the one or more jobs can be associated with one type of encoding (e.g., HD content encoding), and another portion (e.g., 10) of the one or more jobs can be associated with another type of encoding (e.g., SD content encoding).

In an aspect, a plurality of users can transmit a respective requested number of slots to a computing system (e.g., computing device 104). For example, users A, B and C can transmit a respective requested number of encoding slots (e.g., 5, 10, and 20) to the computing system. In an aspect, a device identifier (e.g., device identifier 108) and/or an address element (e.g., address element 110) of a respective user of the plurality of users can be received at the computing system when a request for a requested number of slots is received from the respective user of the plurality of users.

At step 204, an expected number of slots associated with the user can be determined at the computing system. In an aspect, the expected number of slots associated with the user can comprise a guaranteed number of slots that the user expects to access. For example, a user (e.g., a customer) can reserve and/or contract to have access to 20 slots. As such, 20 slots can be the expected number of slots associated with the user. The user can expect to access the guaranteed 20 slots to process one or more of jobs associated with the user.

At step 206, the requested number of slots can be compared to the expected number of slots at the computing system. If the requested number of slots is less than the expected number of slots, the user can be categorized as an under-served user. If the requested number of slots is greater than or equal to the expected number of slots, the user can be categorized as an adequately served user.

At step 208, if the requested number of slots is less than the expected number of slots, the requested number of slots can be allocated to the user. The allocated slots can be available slots, idle slots, or a combination thereof. As such, an under-served user can be given priority to use available resources. In an aspect, slots that have been available for a longer time can be allocated to the user prior to the slots that have just become available.

At step 210, if the requested number of slots is greater than or equal to the expected number of slots, a quantity of slots can be allocated to the user. The quantity of slots can comprise the expected number of slots selected from available slots, idle slots, or a combination thereof, and additionally one or more idle slots up to the requested number of slots, if there are additional one or more idle slots associated with the computing system.

In an aspect, a slot type for each of the plurality of slots can be determined. The slot type can be indicative of a type of job that the slot is configured to process. In an aspect, slot types can be heterogeneous. For example, a slot type can be associated with encoding a type of scene, such as a fast motion scene, a static scene, a black and white scene, and the like. As another example, a slot type can be associated with encoding a video file (e.g., HD video file, SD video file), an audio file, or both. As another example, a slot type can be associated with encoding a long scene (e.g., greater than 10 minutes), a medium length scene (e.g., between 5 and 10 minutes), or a short scene (e.g., shorter than 5 minutes). As another example, a slot type can be associated with a type of codec such as AV 8, H.264, Advanced Video Coding (AVC), MPEG, and the like.

The requested number of slots and the expected number of slots can be allocated based on the determined slot type for each of the plurality of slots. In an aspect, each slot can be set up to only process a certain type of job. Some types of jobs can be more popular at a given time. As a result, some slot types may have restrictions placed on them to prevent a user from using all or more than a predefined portion of all the slots of certain slot types even though the user may be guaranteed a number of slots. For example, if a user requests 20 slots, in which 10 are HD encoding slots and 10 are SD encoding slots, the computing system can allocate 20 encoding slots (e.g., as requested), whereby, for example, 5 of 20 slots can be HD video encoding slots and 15 of 20 slots can be non HD encoding slots (e.g., SD encoding slots) based on availability of HD encoding slot and/or allocation policy for HD encoding slots.

In an aspect, a respective number of slots associated with each type of slot capable of processing the one or more jobs associated with the request can be determined. For example, the computing system can determine that 100 encoding slots can be allocated to the user, whereby, for example, 70 slots can be used to encode HD video files, and 30 slots can be used to encode SD video files. As another example, the computing system can determine that 100 encoding slots can be allocated to the user, whereby, for example, 50 encoding slots can be used for long scenes, 30 encoding slots can be used for medium length scenes, and 20 encoding slots can be used for short scenes. In another aspect, the computing system can determine that a user cannot use more than a maximum number (e.g., 5) and/or portion (e.g., 25%) of a particular type of slots (e.g., HD encoding slots) available at the computing system. As a specific example, when the computing system has a total of 20 HD encoding slots, no user can be allocated more than 5 HD encoding slots. If a user requests 20 slots, in which 10 are HD encoding slots and 10 are SD encoding slots, the computing system can allocate 20 encoding slots as requested, where 5 slots of 20 slots can be HD video encoding slots. As such, allocating the requested number of slots can comprise preventing access to one or more slots based on the determined slot type for each of the plurality of slots. In an aspect, allocating the expected number of slots can comprise preventing access to one or more slots based on the determined slot type for each of the plurality of slots.

In an aspect, a status of each of the plurality of slots at the computing system can be determined. The status can comprise one of used, available, or idle. For example, if a slot is performing a job (e.g., encoding job), the slot can be flagged as used. If a slot is not performing a job (e.g., encoding job), the slot can be flagged as available. If a slot has been available for more than a threshold amount of time, the slot can be flagged as idle. As an example, the flag can be in the form of codes, symbols, glyphs, and the like.

The flag to mark a used encoding slot can be different from the flag to mark an available slot. The flag to mark an idle slot can be different from the flag to mark a used slot and different from the flag to mark an available slot. In an aspect, the flag can comprise a time that the respective slot has become available. In an aspect, the flag can comprise a time that the respective slot has become idle.

In an aspect, the threshold amount of time can be determined linearly. As an example, the threshold amount of time can be determined according to X+n minutes, wherein X is an amount of time a previous encoding slot was available and n is proportional to a number of available slots previously flagged as idle. For example, if a first available slot becomes idle after X minutes, it can take X+m minutes for a second available slot to become idle, X+2m minutes for the third available slot and so on, where m is a selected constant value. More specifically, a first slot can become idle 10 minutes after it becomes available, the second available slot can become idle after 12 minutes, a third available slot can become idle after 14 minutes and so on. When available slots are flagged as idle slots gradually, the computing system can be protected against quick domination of idle slots by adequately served users.

In an aspect, a maximum number of slots associated with the user can be determined. The quantity of allocated slots can be limited such that the user is not allocated more than the maximum number of slots. In an aspect, the maximum number of slots associated with a user can be determined by multiplying a percentage of the requested slots (e.g., 200% for the highest priority user, 150% for the second highest priority user, 100% for the third highest priority user). For example, if user A (e.g., a highest priority user) requests 5 slots, the maximum number of slots associated with the user A can be 10 slots (e.g., 200% of requested slots). For user B (e.g., a second highest priority user) that requests 10 encoding slots, the maximum number of slots associated with the user B can be 15 slots (e.g., 150%). For user C (e.g., a third highest priority user) that requests 20 encoding slots, the maximum number of slots associated with the user C can be 20 slots (e.g., 100%). In another aspect, the percentage can be the same for each user.

At step 212, the one or more jobs can be processed at the computing system using the allocated slots. In an aspect, the status of the allocated slots can be marked as used when they are processing the one or more jobs. Once the one or more jobs have been processed, the slots used to process the one or more jobs can become available or idle, and can be allocated to process other jobs.

FIG. 3 is a flowchart illustrating another example method 300. At step 302, a request for processing one or more jobs can be received from a user at a computing system. The computing system can comprise one or more computing devices. In an aspect, the computing system can be associated with a plurality of slots configured for processing the one or more jobs. For example, an encoding computing system (e.g., the computing device 104) can receive a request to encode one or more encoding jobs from a user (e.g., the user device 102). For example, the one or more jobs can be additional jobs that become available after a number of slots have been allocated to the user. As another example, the one or more jobs can be extra jobs exceeding processing capacity of the slots allocated to the user. In an aspect, the one or more jobs (e.g., encoding jobs) can be associated with one or more slot types. For example, a portion of the one or more encoding jobs can be associated with a long scene (e.g., greater than 10 minutes), and another portion of the one or more encoding jobs can be associated with a medium length scene (e.g., between 5 and 10 minutes).

At step 304, a category associated with the user can be determined. The category can comprise one of an underserved user or an adequately served user. In an aspect, the computing system (e.g., computing device 104) can determine the category associated with the user. In an aspect, determining a category associated with the user can comprise determining an expected number of slots associated with the user. The user can be categorized as an adequately served user if the expected number of slots is insufficient to process the one or more jobs. The user can be categorized as an under-served user if the expected number of slots is sufficient to process the one or more jobs.

At step 306, a status of each of the plurality of slots can be determined. In an aspect, the status can comprise one of used, available, or idle. For example, if a slot is performing a job (e.g., encoding job), the slot can be flagged as used. If a slot is not performing a job (e.g., encoding job), the slot can be flagged as available. If a slot has been available for more than a threshold amount of time, the slot can be flagged as idle. As an example, the flag can be in the form of codes, symbols, glyphs, and the like.

The flag to mark a used encoding slot can be different from the flag to mark an available slot. The flag to mark an idle slot can be different from the flag to mark a used slot and different from the flag to mark an available slot. In an aspect, the flag can comprise a time that the respective slot has become available. In an aspect, the flag can comprise a time that the respective slot has become idle.

In an aspect, the threshold amount of time can be determined linearly. As an example, the threshold amount of time can be determined according to X+n minutes, wherein X is an amount of time a previous encoding slot was available and n is proportional to a number of available slots previously flagged as idle. For example, if a first available slot becomes idle after X minutes, it can take X+m minutes for a second available slot to become idle, X+2m minutes for the third available slot and so on, where m is a selected constant value. More specifically, a first slot can become idle 10 minutes after it becomes available, the second available slot can become idle after 12 minutes, a third available slot can become idle after 14 minutes and so on. When available slots are flagged as idle slots gradually, the computing system can be protected against quick domination of idle slots by adequately served users.

At step 308, if the user is an under-served user, one or more slots can be allocated to process the one or more jobs up to an expected number of slots associated with the user. In an aspect, the one or more allocated slots can comprise available slots, idle slots, or a combination thereof. As such, an under-served user can be given priority to use available resources. In an aspect, slots that have been available for a longer time can be allocated to the user prior to the slots that have just become available.

At step 310, if the user is an adequately served user, one or more idle slots can be allocated to process the one or more jobs, if there are one or more idle slots associated with the computing system. If there is no idle slot associated with the computing system, the system will not allocate any slots to the adequately served user. In an aspect, the computing system can place a hold on the request for a predefined amount of time (e.g., 30 seconds). Once there are one or more idle slots within the predefined amount of time, the one or more idle slots can be allocated to the adequately served user.

In an aspect, types of slots capable of processing the one or more jobs associated with the request can be determined. In an aspect, slot types can be heterogeneous. For example, a slot type can be associated with encoding a type of scene, such as a fast motion scene, a static scene, a black and white scene, and the like. As another example, a slot type can be associated with encoding a video file (e.g., HD video file, SD video file), an audio file, or both. As another example, a slot type can be associated with encoding a long scene (e.g., greater than 10 minutes), a medium length scene (e.g., between 5 and 10 minutes), or a short scene (e.g., shorter than 5 minutes). As another example, a slot type can be associated with a type of codec such as AV 8, H.264, Advanced Video Coding (AVC), MPEG, and the like.

In an aspect, a respective number of slots associated with each type of slot capable of processing the one or more jobs can be determined. For example, the computing system can determine that 100 encoding slots can be allocated to the user, where, for example, 70 slots can be used to encode HD video files, and 30 slots can be used to encode SD video files. As another example, the computing system can determine that 100 encoding slots can be allocated to the user, whereby, for example, 50 encoding slots can be used for long scenes, 30 encoding slots can be used for medium length scenes, and 20 encoding slots can be used for short scenes. In another aspect, the computing system can determine that a user cannot use more than a maximum number (e.g., 5) and/or portion (e.g., 25%) of a particular type of slots (e.g., HD encoding slots) available at the computing system. As a specific example, when the computing system has total 20 HD encoding slots, no user can be allocated more than 5 HD encoding slots. If a user requests 20 slots, in which 10 are HD encoding slots and 10 are SD encoding slots, the computing system can allocate 20 encoding slots as requested, whereby 5 slots of 20 slots can be HD video encoding slots.

In an aspect, one or more slots allocated to an adequately served user can be re-allocated to an under-served user. For example, if the computing system receives a request for processing one or more jobs from an under-served user, the computing system can cancel a job for an adequately served user and release a slot associated with the canceled job. The released slot can be allocated to the under-served user.

In an aspect, both adequately served user and under-served users can request for processing one or more jobs. To favor an under-served user over an adequately served user, encoding slots can be allocated to under-served users prior to adequately served users. In an aspect, if multiple under-served users request additional encoding slots, additional encoding slots can be allocated to a higher level under-served users. For example, a higher level can be determined if a user is associated with a higher user level, a higher customer level, a higher business class, a higher service tier, or the like. As another example, a higher level can be determined if a user is associated with a more important job (e.g., an encoding job with higher urgency). If multiple under-served users request additional encoding slots, and the multiple under-served users are in the same level, a round-robin method can be used to allocate slots.

At step 312, the one or more jobs can be processed at the computing system using the allocated one or more slots, if any. In an aspect, the status of the allocated slots can be marked as used when they are processing the one or more jobs. Once the one or more jobs have been processed, the slots used to process the one or more jobs can become available or idle, and can be allocated to process other jobs.

FIG. 4 is a flowchart illustrating an example method 400. At step 402, a plurality of expected numbers of slots can be received at a computing system comprising one or more computing devices. The plurality of expected numbers of slots can be associated with a respective plurality of users.

At step 404, a total number of slots can be assigned to the computing system, based on the plurality of expected numbers of slots. In an aspect, the total number of slots assigned to the computing system (e.g., the computing device 104) can be determined based on privileges of the respective plurality of users (e.g., the highest priority user, the second highest priority user, etc.), job processing history for the plurality of users, allocation policy associated with a particular type of slots, and any other factors. For example, if users A, B and C request 5, 10 and 20 slots from the computing system, respectively, a total of 35 slots can be assigned to the computing system for the users A, B and C. If the processing history indicates that users A, B and C are always active (e.g., submitting encoding jobs) simultaneously. As an example, a total of 40 slots can be assigned to the computing system for the users A, B and C to ensure extra capacity for users A, B and C who are likely to be active simultaneously. As another example, if the job processing history indicates that user C is never active when either users A or user B is active, a total of 20 slots can be assigned to the computing system for the users A, B and C.

At step 406, a slot type for each slot of the total number of slots at the computing system can be determined. In an aspect, slot types can be heterogeneous. For example, a slot type can be associated with encoding a type of scene, such as a fast motion scene, a static scene, a black and white scene, and the like. As another example, a slot type can be associated with encoding a video file (e.g., HD video file, SD video file), an audio file, or both. As another example, a slot type can be associated with encoding a long scene (e.g., greater than 10 minutes), a medium length scene (e.g., between 5 and 10 minutes), or a short scene (e.g., shorter than 5 minutes). As another example, a slot type can be associated with a type of codec such as AV 8, H.264, Advanced Video Coding (AVC), MPEG, and the like.

At step 408, a plurality of limits associated with the total number of slots at the computing system can be established. In an aspect, the plurality of limits associated with the total number of slots can be determined based on policies related to slot allocation. For example, the plurality of limits can comprise a total number of slots a particular user can have at a specific time. As another example, the plurality of limits can comprise a maximum number of a specific type of slots a particular user can access simultaneously.

At step 410, a slot status for each slot of the total number of slots can be monitored at the computing system. In an aspect, a status of each of the total number of slots at the computing system can be monitored. The status can comprise one of used, available, or idle. For example, if a slot is performing a job (e.g., encoding job), the slot can be flagged as used. If a slot is not performing a job (e.g., encoding job), the slot can be flagged as available. If a slot has been available for more than a threshold amount of time, the slot can be flagged as idle. As an example, the flag can be in the form of codes, symbols, glyphs, and the like.

The flag to mark a used encoding slot can be different from the flag to mark an available slot. The flag to mark an idle slot can be different from the flag to mark a used slot and different from the flag to mark an available slot. In an aspect, the flag can comprise a time that the respective slot has become available. In an aspect, the flag can comprise a time that the respective slot has become idle.

In an aspect, the threshold amount of time can be determined linearly. As an example, the threshold amount of time can be determined according to X+n minutes, wherein X is an amount of time a previous encoding slot was available and n is proportional to a number of available slots previously flagged as idle. For example, if a first available slot becomes idle after X minutes, it can take X+m minutes for a second available slot to become idle, X+2m minutes for the third available slot and so on, where m is a selected constant value. More specifically, a first slot can become idle 10 minutes after it becomes available, the second available slot can become idle after 12 minutes, a third available slot can become idle after 14 minutes and so on. When available slots are flagged as idle slots gradually, the computing system can be protected against quick domination of idle slots by adequately served users.

At step 412, one or more job requests can be received from the respective plurality of users. For example, a computing system (e.g., the computing device 104) can receive one or more job requests from the respective plurality of users. In an aspect, the one or more job requests can comprise one or more requested number of slots from the respective plurality of users. In another aspect, the one or more jobs requests can comprise one or more encoding jobs to be processed. In an aspect, the one or more jobs (e.g., encoding jobs) can be associated with one or more slot types. For example, a portion of the one or more encoding jobs can be associated with a long scene (e.g., greater than 10 minutes), and another portion of the one or more encoding jobs can be associated with a medium length scene (e.g., between 5 and 10 minutes). As another example, a portion of the one or more encoding jobs can be associated with HD video encoding, and another portion of the one or encoding jobs can be associated with SD video encoding.

At step 414, a respective number of slots from the total number of slots at the computing system can be allocated to a respective one or more of the plurality of users, based on the one or more job requests, the plurality of expected numbers of slots, the slot types, the plurality of limits, and the monitored slot statuses. In an aspect, the respective number of slots can be allocated to the respective one or more of the plurality of users according to descriptions in FIG. 2 and FIG. 3.

In an aspect, the computing system (e.g., computing device 104) can determine category associated with the respective plurality of users. In an aspect, determining a category associated with a user can comprise determining an expected number of slots associated with the user. A user can be categorized as an adequately served user if the expected number of slots associated with the user is insufficient to process one or more jobs in the user's job request. The user can be categorized as an underserved user if the expected number of slots associated with the user is sufficient to process one or more jobs in the user's job request.

In an aspect, if a user is an under-served user, one or more slots can be allocated to process the one or more jobs up to an expected number of slots associated with the user. The one or more allocated slots can comprise available slots, idle slots, or a combination thereof. As such, an under-served user can be given priority to use available resources. In an aspect, slots that have been available for a longer time can be allocated to the user prior to the slots that have just become available. If a user is an adequately served user, one or more idle slots can be allocated to process the one or more jobs.

In an aspect, a respective number of slots associated with each type of slot capable of processing the one or more job requests can be determined. For example, the computing system can determine that 100 encoding slots can be allocated to the user where, for example, 70 slots can be used to encode HD video files, and 30 slots can be used to encode SD video files. As another example, the computing system can determine that 100 encoding slots can be allocated to the user, whereby, for example, 50 encoding slots can be used for long scenes, 30 encoding slots can be used for medium length scenes, and 20 encoding slots can be used for short scenes. In another aspect, the computing system can determine that a user cannot use more than a maximum number (e.g., 5) and/or portion (e.g., 25%) of a particular type of slots (e.g., HD encoding slots) available at the computing system. As a specific example, when the computing system has total 20 HD encoding slots, no user can be allocated more than 5 HD encoding slots. If a user requests 20 slots, in which 10 are HD encoding slots and 10 are SD encoding slots, the computing system can allocate 20 encoding slots as requested, whereby 5 slots of 20 slots can be HD video encoding slots.

At step 416, the one or more job requests can be processed by the computing system utilizing the allocated respective number of slots. The allocated respective number of slots can be used to process one or more jobs associated with the one or more job requests. In an aspect, the status of the allocated respective number of slots can be marked as used when they are processing the one or more jobs. Once the one or more jobs have been processed, the slots used to process the one or more jobs can be marked available or idle and can be allocated to process other job requests.

Figure 5:
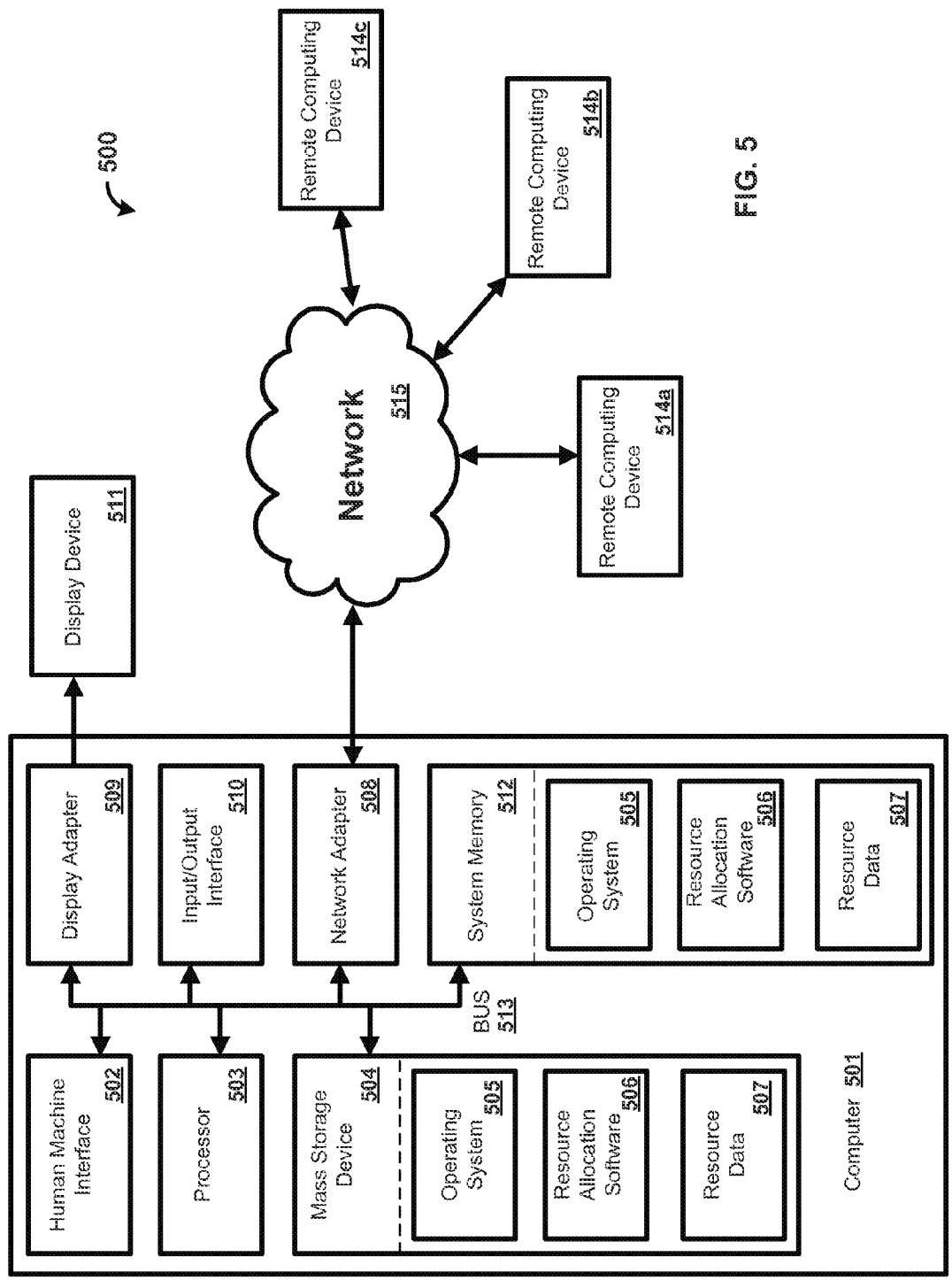
FIG. 5 is a block diagram illustrating an example computing device.

In an exemplary aspect, the methods and systems can be implemented on a computer 501 as illustrated in FIG. 5 and described below. By way of example, a computing system such as the computing device 104 of FIG. 1 can be a computer 501 as illustrated in FIG. 5. Similarly, the methods and systems disclosed can utilize one or more computers to perform one or more functions in one or more locations. FIG. 5 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of the computer 501 can comprise, but are not limited to, one or more processors or processing units 503, a system memory 512, and a system bus 513 that couples various system components including the processor 503 to the system memory 512. In the case of multiple processing units 503, the system can utilize parallel computing.

The system bus 513 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 513, and all buses specified in this description can also be implemented over a wired or wireless network connection and each of the subsystems, including the processor 503, a mass storage device 504, an operating system 505, resource allocation software 506, resource data 507, a network adapter 508, system memory 512, an Input/Output Interface 510, a display adapter 509, a display device 511, and a human machine interface 502, can be contained within one or more remote computing devices 514a,b,c at physically separate locations, connected through buses of this form, in effect implementing a fully distributed system.

The computer 501 typically comprises a variety of computer readable media. Exemplary readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as resource data 507 and/or program modules such as operating system 505 and resource allocation software 506 that are immediately accessible to and/or are presently operated on by the processing unit 503.

In another aspect, the computer 501 can also comprise other removable/non-removable, volatile/non-volatile computer storage media. By way of example, FIG. 5 illustrates a mass storage device 504 which can provide non-volatile storage of computer code, computer readable instructions, data structures, program modules, and other data for the computer 501. For example and not meant to be limiting, a mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, an operating system 505 and resource allocation software 506. Each of the operating system 505 and resource allocation software 506 (or some combination thereof) can comprise elements of the programming and the resource allocation software 506. Resource data 507 can also be stored on the mass storage device 504. Resource data 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 503 via a human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, a display device 511 can also be connected to the system bus 513 via an interface, such as a display adapter 509. It is contemplated that the computer 501 can have more than one display adapter 509 and the computer 501 can have more than one display device 511. For example, a display device can be a monitor, an LCD (Liquid Crystal Display), or a projector. In addition to the display device 511, other output peripheral devices can comprise components such as speakers (not shown) and a printer (not shown) which can be connected to the computer 501 via Input/Output Interface 510. Any step and/or result of the methods can be output in any form to an output device. Such output can be any form of visual representation, including, but not limited to, textual, graphical, animation, audio, tactile, and the like. The display 511 and computer 501 can be part of one device, or separate devices.

The computer 501 can operate in a networked environment using logical connections to one or more remote computing devices 514*a,b,c*. By way of example, a remote computing device can be a personal computer, portable computer, smartphone, a server, a router, a network computer, a peer device or other common network node, and so on. Logical connections between the computer 501 and a remote computing device 514*a,b,c* can be made via a network 515, such as a local area network (LAN) and/or a general wide area network (WAN). Such network connections can be through a network adapter 508. A network adapter 508 can be implemented in both wired and wireless environments. Such networking environments are conventional and commonplace in dwellings, offices, enterprise-wide computer networks, intranets, and the Internet.

For purposes of illustration, application programs and other executable program components such as the operating system 505 are illustrated herein as discrete blocks, although it is recognized that such programs and components reside at various times in different storage components of the computing device 501, and are executed by the data processor(s) of the computer. An implementation of resource allocation software 506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
    receiving, at a computing system comprising one or more computing devices, a request from a user for a requested number of slots for processing one or more jobs, wherein the computing system is associated with a plurality of slots;
    determining, at the computing system, an expected number of slots associated with the user;
    comparing, at the computing system, the requested number of slots to the expected number of slots;
    if the requested number of slots is less than the expected number of slots, allocating the requested number of slots, wherein the allocated slots are available slots, idle slots, or a combination thereof;
    if the requested number of slots is greater than or equal to the expected number of slots, allocating a quantity of slots, wherein the quantity of slots comprises the expected number of slots selected from available slots, idle slots or a combination thereof, and additional one or more idle slots up to the requested number of slots, if there are additional one or more idle slots associated with the computing system; and
    processing, at the computing system, the one or more jobs using the allocated slots.

2. The method of claim 1, wherein the one or more jobs comprise video processing jobs and the plurality of slots are configured to process video.

3. The method of claim 1, wherein the expected number of slots associated with the user comprises a guaranteed number of slots that the user expects to access.

4. The method of claim 1, further comprising:
   determining a maximum number of slots associated with the user; and
   limiting the quantity of allocated slots such that the user is not allocated more than the maximum number of slots.

5. The method of claim 1, further comprising, determining a slot type for each of the plurality of slots, wherein the slot type is indicative of a type of job that the slot is configured to process.

6. The method of claim 5, wherein allocating the requested number of slots comprises preventing access to one or more slots based on the determined slot type for each of the plurality of slots.

7. The method of claim 5, wherein allocating the expected number of slots comprises preventing access to one or more slots based on the determined slot type for each of the plurality of slots.

8. The method of claim 5, wherein the requested number of slots and the expected number of slots are allocated based on the determined slot type for each of the plurality of slots.

9. The method of claim 1, further comprising determining a status of each of the plurality of slots at the computing system.

10. The method of claim 9, wherein determining the status of each of the plurality of slots at the computing system comprises:
    determining the status of a slot as a used slot if the slot is processing a job;
    determining the status of a slot as an available slot if the slot is not processing a job; and
    determining the status of a slot as an idle slot if the slot has been available for more than a threshold amount of time.

11. The method of claim 10, wherein the threshold amount of time is determined according to X+n minutes, wherein X is an amount of time a previous slot was available and n is proportional to a number of available slots previously determined as idle.

12. A method comprising:
    receiving, at a computing system comprising one or more computing devices, a request for processing one or more jobs from a user, wherein the computing system is associated with a plurality of slots configured for processing the one or more jobs;
    determining a category associated with the user, wherein the category comprises one of an under-served user or an adequately served user;
    determining a status of each of the plurality of slots, wherein the status comprises one of used, available, or idle;
    if the user is an under-served user, allocating one or more slots to process the one or more jobs up to an expected number of slots associated with the user, wherein the one or more allocated slots comprise available slots, idle slots, or a combination thereof;
    if the user is an adequately served user, allocating one or more idle slots to process the one or more jobs, if there are one or more idle slots associated with the computing system; and
    processing, at the computing system, the one or more jobs using the allocated one or more slots, if any.

13. The method of claim 12, wherein determining the status of each of the plurality of slots comprises:
    determining the status of a slot as a used slot if the slot is processing a job;
    determining the status of a slot as an available slot if the slot is not processing a job; and
    determining the status of a slot as an idle slot if the slot has been available for more than a threshold amount of time.

14. The method of claim 12, wherein determining a category associated with the user comprises:
    determining an expected number of slots associated with the user;
    categorizing the user as an adequately served user if the expected number of slots is insufficient to process the one or more jobs; and
    categorizing the user as an underserved user if the expected number of slots is sufficient to process the one or more jobs.

15. The method of claim 12, wherein the allocating one or more slots to process the one or more jobs is based on an availability of one or more types of slots.

16. The method of claim 12, wherein if the user is an under-served user, allocating one or more slots to process the one or more jobs comprises:
    canceling a job for an adequately served user;
    releasing a slot associated with the canceled job; and
    allocating the released slot to the under-served user.

17. A method comprising:
    receiving, at a computing system comprising one or more computing devices, a plurality of expected numbers of slots, wherein the plurality of expected numbers of slots is associated with a respective plurality of users;
    assigning a total number of slots to the computing system, based on the plurality of expected numbers of slots;
    determining a slot type for each slot of the total number of slots at the computing system;
    establishing a plurality of limits associated with the total number of slots at the computing system;
    monitoring a slot status for each slot of the total number of slots at the computing system;
    receiving one or more job requests from the respective plurality of users;
    allocating a respective number of slots from the total number of slots at the computing system to a respective one or more of the plurality of users, based on the one or more job requests, the plurality of expected numbers of slots, the slot types, the plurality of limits, and the monitored slot statuses; and
    processing, by the computing system, the one or more job requests utilizing the allocated respective number of slots.

18. The method of claim 17, wherein the plurality of limits comprises one or more of: a maximum number of slots allocated to a user, a maximum percentage of the total number of slots allocated to a user, a maximum number of slots associated with a slot type allocated to a user, a maximum percentage of the total number of slots associated with a slot type allocated to a user, and a user level.

19. The method of claim 17, wherein monitoring the slot status for each slot of the total number of slots at the computing system comprises:
    determining the status of a slot as a used slot if the slot is processing a job;
    determining the status of a slot as an available slot if the slot is not processing a job; and
    determining the status of a slot as an idle slot if the slot has been available for more than a threshold amount of time.

20. The method of claim 17, wherein allocating the respective number of slots from the total number of slots at the computing system to the respective one or more of the plurality of users comprises:

determining a category of the respective one or more of the plurality of users, wherein the category comprises one of an under-served user and an adequately served user;

allocating one or more idle slots to adequately served users among the respective one or more of the plurality of users; and allocating one or more available slots, one or more idle slots, or a combination thereof to under-served users among the respective one or more of the plurality of users.

* * * * *